(12) United States Patent
Tilney

(10) Patent No.: US 9,706,829 B2
(45) Date of Patent: Jul. 18, 2017

(54) PORTABLE DOCKING DEVICE

(71) Applicant: Rocky Gabriel Tilney, San Jose, CA (US)

(72) Inventor: Rocky Gabriel Tilney, San Jose, CA (US)

( * ) Notice: Subject to any disclaimer, the term of this patent is extended or adjusted under 35 U.S.C. 154(b) by 97 days.

(21) Appl. No.: 14/798,158

(22) Filed: Jul. 13, 2015

(65) Prior Publication Data

US 2016/0018849 A1    Jan. 21, 2016

Related U.S. Application Data

(60) Provisional application No. 62/027,185, filed on Jul. 21, 2014.

(51) Int. Cl.
| | | |
|---|---|---|
| *A45F 5/00* | (2006.01) | |
| *A45C 13/10* | (2006.01) | |
| *H04B 1/3827* | (2015.01) | |
| *H04B 1/3888* | (2015.01) | |

(52) U.S. Cl.
CPC ............ *A45F 5/00* (2013.01); *A45C 13/1069* (2013.01); *H04B 1/385* (2013.01); *H04B 1/3888* (2013.01); *A45F 2005/008* (2013.01); *A45F 2200/0516* (2013.01); *A45F 2200/0533* (2013.01)

(58) Field of Classification Search
CPC .................. A45F 5/00; A45F 2005/008; A45F 2200/0516; A45F 2200/0533; A45C 13/1069; H04B 1/385; H04B 1/3888
See application file for complete search history.

(56) References Cited

U.S. PATENT DOCUMENTS

| | | | |
|---|---|---|---|
| 6,301,754 B1 * | 10/2001 | Grunberger | A41F 1/002 24/303 |
| 6,888,940 B1 | 5/2005 | Deppen | |
| 8,317,067 B2 | 11/2012 | Lewis | |
| 9,397,719 B1 * | 7/2016 | Schmidt | F16M 11/24 |
| 9,427,070 B1 * | 8/2016 | Bastian | A45F 5/02 |
| 2012/0080462 A1 | 4/2012 | Hajarian | |
| 2013/0221189 A1 * | 8/2013 | Kubin | F16M 13/04 248/683 |
| 2013/0326790 A1 | 12/2013 | Cauwels et al. | |
| 2015/0286117 A1 * | 10/2015 | Sung | A42B 3/04 224/191 |
| 2016/0007723 A1 * | 1/2016 | Georges | A45F 5/00 224/580 |
| 2016/0106202 A1 * | 4/2016 | Ford | A45C 13/1069 224/267 |

* cited by examiner

*Primary Examiner* — Corey Skurdal
(74) *Attorney, Agent, or Firm* — Frank M. Washko; Furqan Nanji

(57) ABSTRACT

A portable docking device includes a mounting device that is configured to be attached to a user. The mounting device includes a user attachment mechanism that has a docking area and first ferromagnetic material attached to the docking area. A portable device holder is configured to receive and hold securely a portable device. The portable device holder includes second ferromagnetic material positioned on the portable device holder so as to allow the portable device holder to be securely attached to the mounting device by a magnetic field generated by at least one of the first ferromagnetic material and the second ferromagnetic material.

16 Claims, 10 Drawing Sheets

PORTABLE DOCKING DEVICE

BACKGROUND

Portable electronic devices are essential accoutrements for those with an active and engaged lifestyle. Portable electronic devices can include for example, smart phones, cameras, global positioning systems (GPS), health monitoring devices, and so on. Some activities, such as running, jogging, bicycling, swimming and various other sports ventures, however, are often done in clothing with limited ability to store, transport and make accessible such electronic devices.

DESCRIPTION OF THE EMBODIMENT

A portable docking device includes a mounting device that is configured to be attached to a user. The mounting device includes a user attachment mechanism that has a docking area and first ferromagnetic material attached to the docking area. A portable device holder is configured to receive and hold securely a portable device. The portable device holder includes second ferromagnetic material positioned on the portable device holder so as to allow the portable device holder to be securely attached to the mounting device by a magnetic field generated by at least one of the first ferromagnetic material and the second ferromagnetic material.

For example, the user attachment mechanism is a band, a strap, a clip, a belt or a tie. For example, the portable device holder is a case, a cradle, a cover or some other device capable of holding a portable device. For example, the portable device may be integrated as housing for the portable device. For example, the portable device is a smart phone, a camera, a global positioning system (GPS), a health monitoring device such as a heart monitor, an activity monitoring device, a tablet computer, or some other portable electronic or non-electronic device. For example, the second ferromagnetic material is a metal plate located within the portable device holder or attached to an outside region of the portable device holder.

For example, the user attachment mechanism includes an inside layer that is worn nearest the user and includes an outside layer. The first ferromagnetic material is located between the inside layer and the outside layer. For example, the outside layer includes, at the docking area, a protrusion area for the first ferromagnetic material. The first ferromagnetic material is held within the protrusion area. For example, the portable device holder includes an inset area for the protrusion area. The inset area is sized and located so that when the portable device holder is securely attached to the mounting device, the protrusion area fits within the inset area.

As used herein, ferromagnetic material refers to any material that is a magnet or could be attracted to a magnet. Therefore, metal is considered ferromagnetic material if it can be attracted to a magnet. A magnet is also considered ferromagnetic material.

Figure 1:
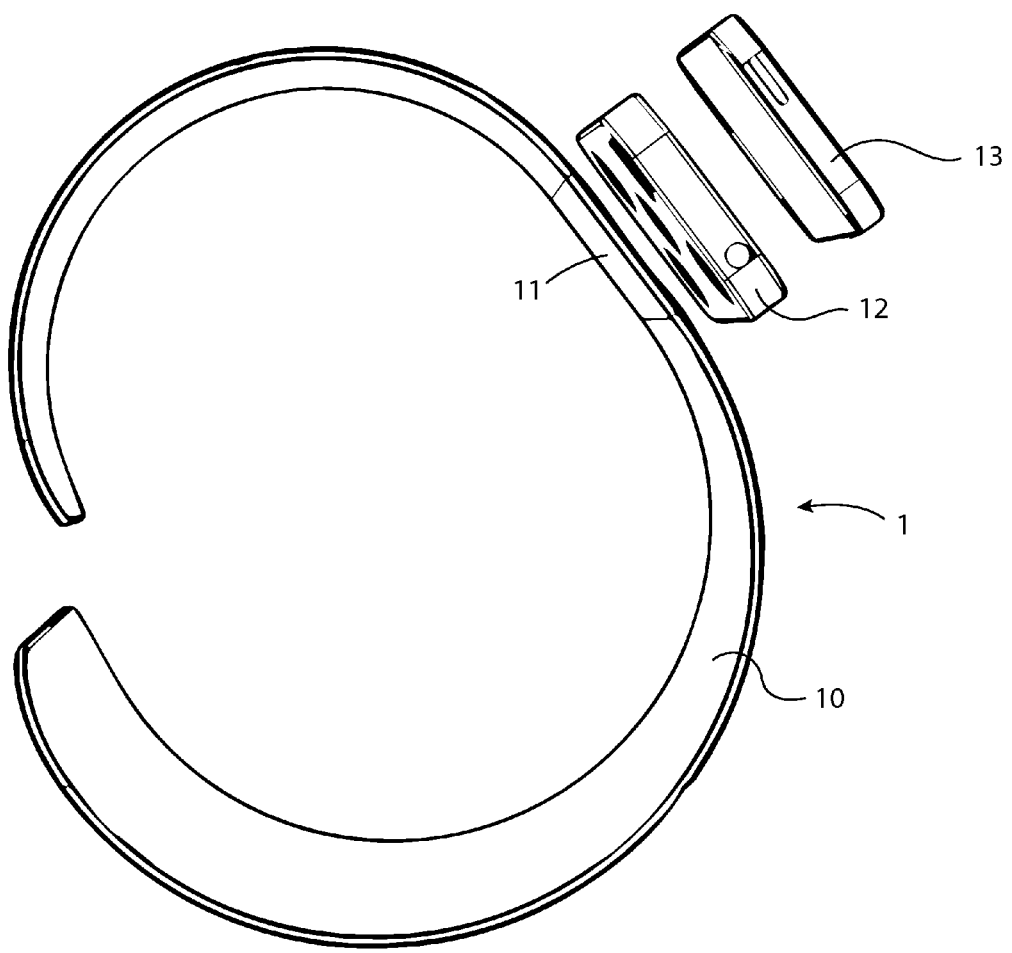
FIG. 1 shows a portable docking device that includes a docking area that receives a portable device holder in accordance with an implementation.

FIG. 1 shows a portable docking device 1 that includes a strap 10 having a docking area 11. In the implementation shown in FIG. 1, strap 10 is used as a user attachment mechanism. Other examples of a user attachment mechanism include a band, a clip, a belt, a tie of some other device used to mechanically attach to a user.

A portable device holder 12 is configured to receive and hold securely a portable device 13. In the example shown in FIG. 1, portable device 13 is a smart phone and portable device holder 13 is a case for holding portable device 13. For example, portable device 13 could also be a camera, a global positioning system (GPS), a health monitoring device, a tablet computer, or some other portable electronic device or even non-electronic device.

Figure 2:
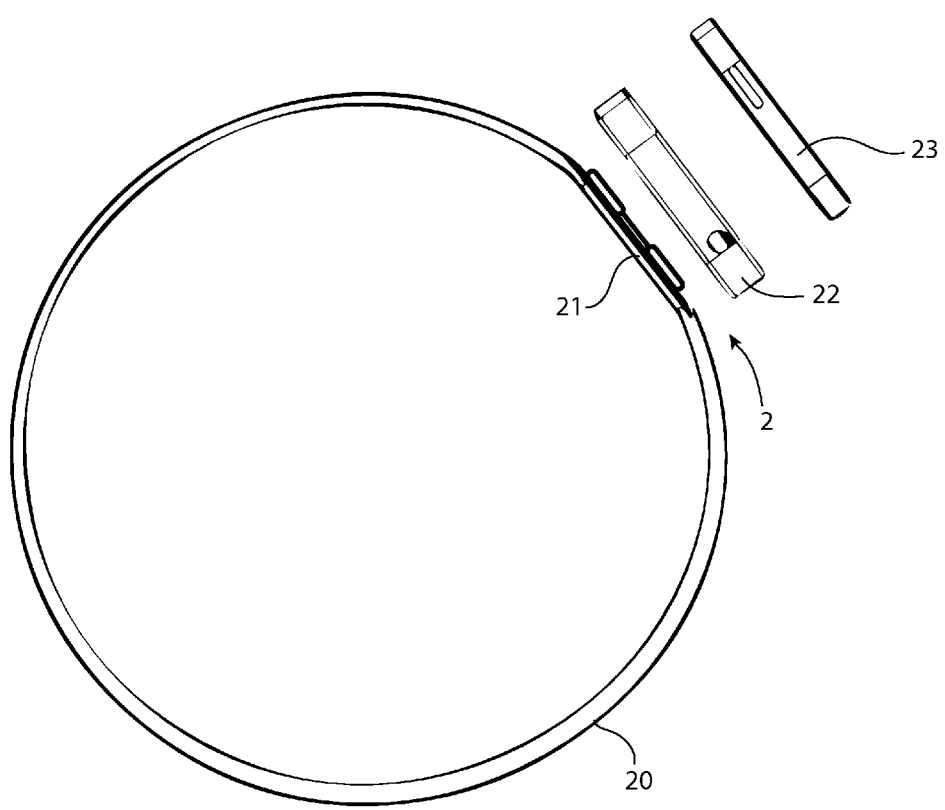
FIG. 2 shows a portable docking device that includes a docking area that receives a portable device holder in accordance with another implementation.

FIG. 2 shows a portable docking device 2 that includes a band 20 having a docking area 21. A portable device holder 22 is configured to receive and hold securely a portable device 23. In the example shown in FIG. 2, portable device 23 is a smart phone and portable device holder 23 is a case for holding portable device 23.

Figure 3:
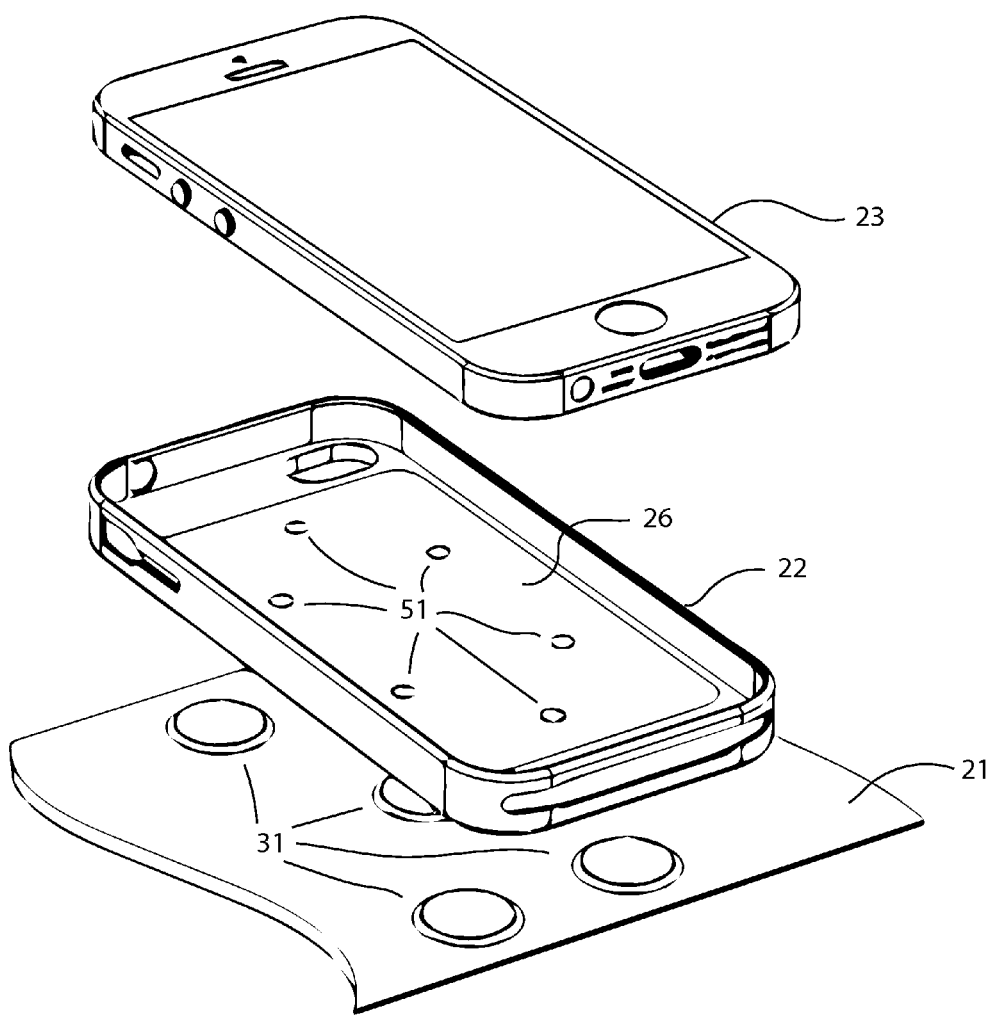
FIG. 3 shows additional detail of a portable device ready to be placed in a case and mounted on a portable docking device in accordance with an implementation.

FIG. 3 shows ferromagnetic material in the form of a metal plate 26 being positioned within in portable device holder 22. For example, metal plate 26 includes holes 51 that, as further explained below, are used to align positioning of metal plate 26 within portable device holder 22. Also, as will be described further below, protrusion areas 31 on docking area 21 are used to position and secure portable device holder 22 on docking area 21.

While FIG. 3 shows ferromagnetic material in the form of a metal plate 26, ferromagnetic material can be used in other forms. For example, ferromagnetic beads, ferromagnetic fiber and/or ferromagnetic powder can be integrated within portable device holder 22. Likewise, more than one metal plate or other shapes of metal can be used as ferromagnetic material.

Figure 4:
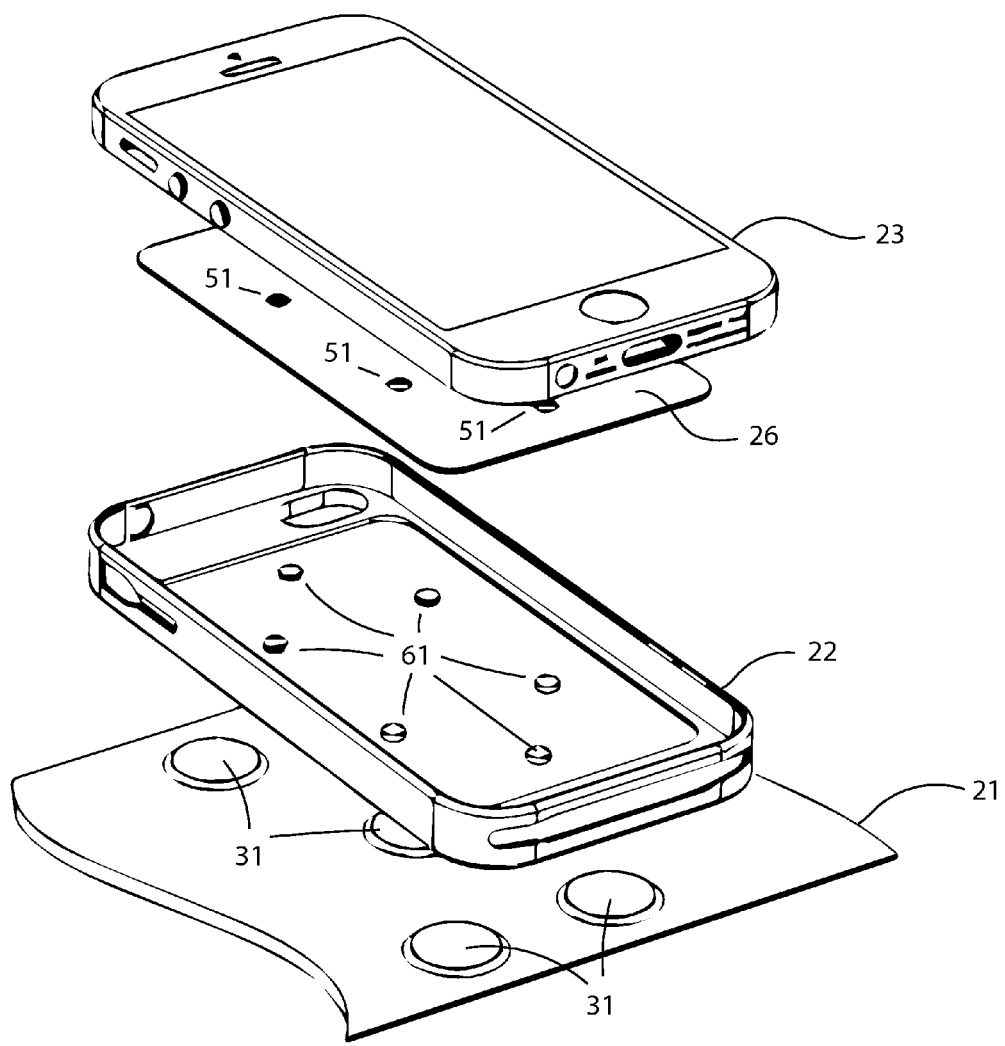
FIG. 4 illustrates use of a metal plate when placing a portable device in a case and mounting the case on a portable docking device in accordance with an implementation.

FIG. 4 shows metal plate 26 lifted from portable device holder 22 to reveal knobs 61. When metal plate 26 is aligned within portable device holder 22, holes 51 of metal plate 26 fit around knobs 61 of portable device holder 22. This serves to maintain alignment of metal plate 26 within portable device holder 22.

Figure 5:
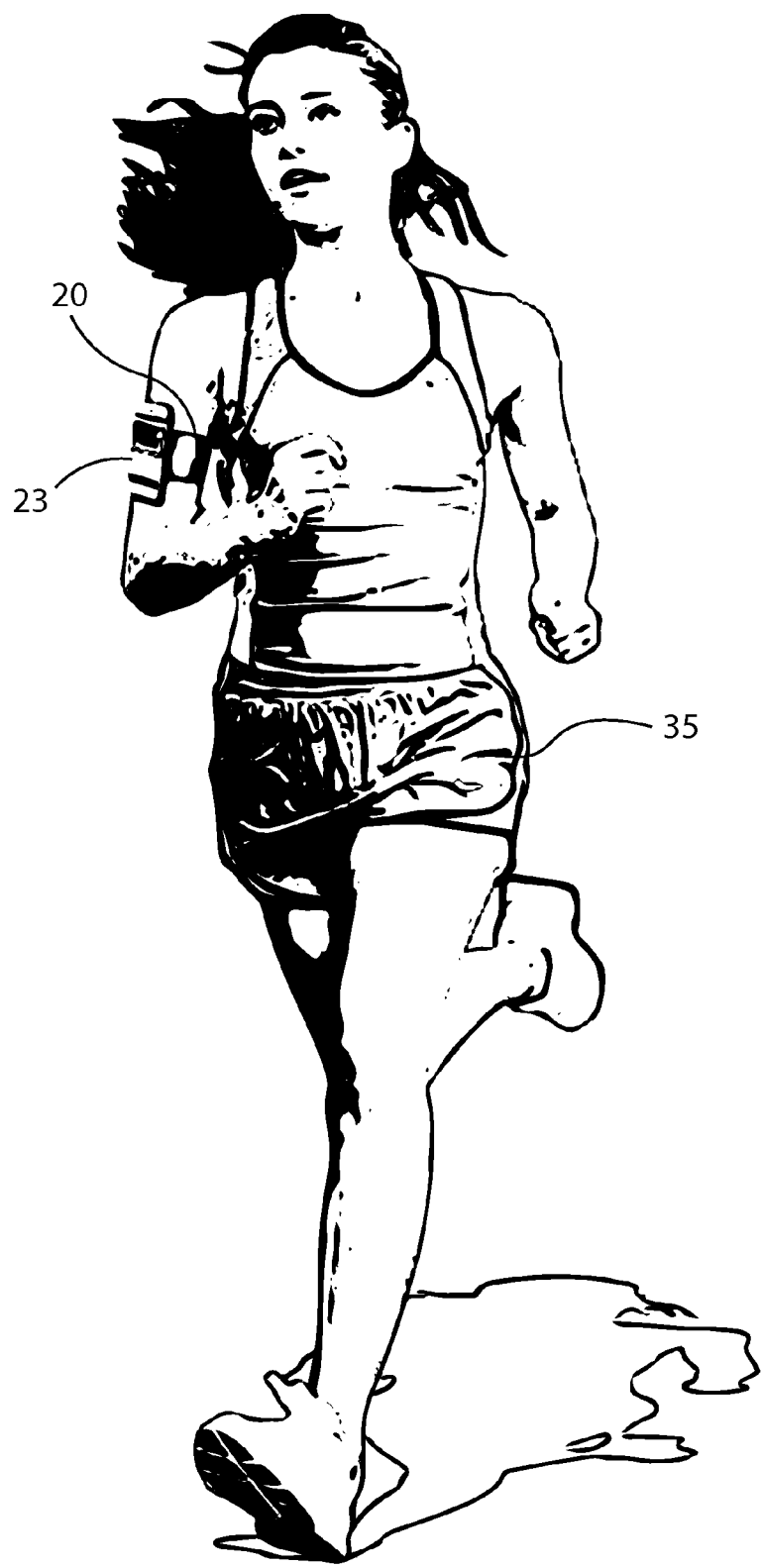
FIG. 5 and FIG. 6 illustrate use of the portable device mounted on a portable docking device in accordance with an implementation.

FIG. 5 shows band 20 placed around the upper arm of a user 35 engaged in the sport of running. Portable device 23, held securely in portable device holder 22, is available for use by user 35 while actively engaged in sport.

Figure 6:
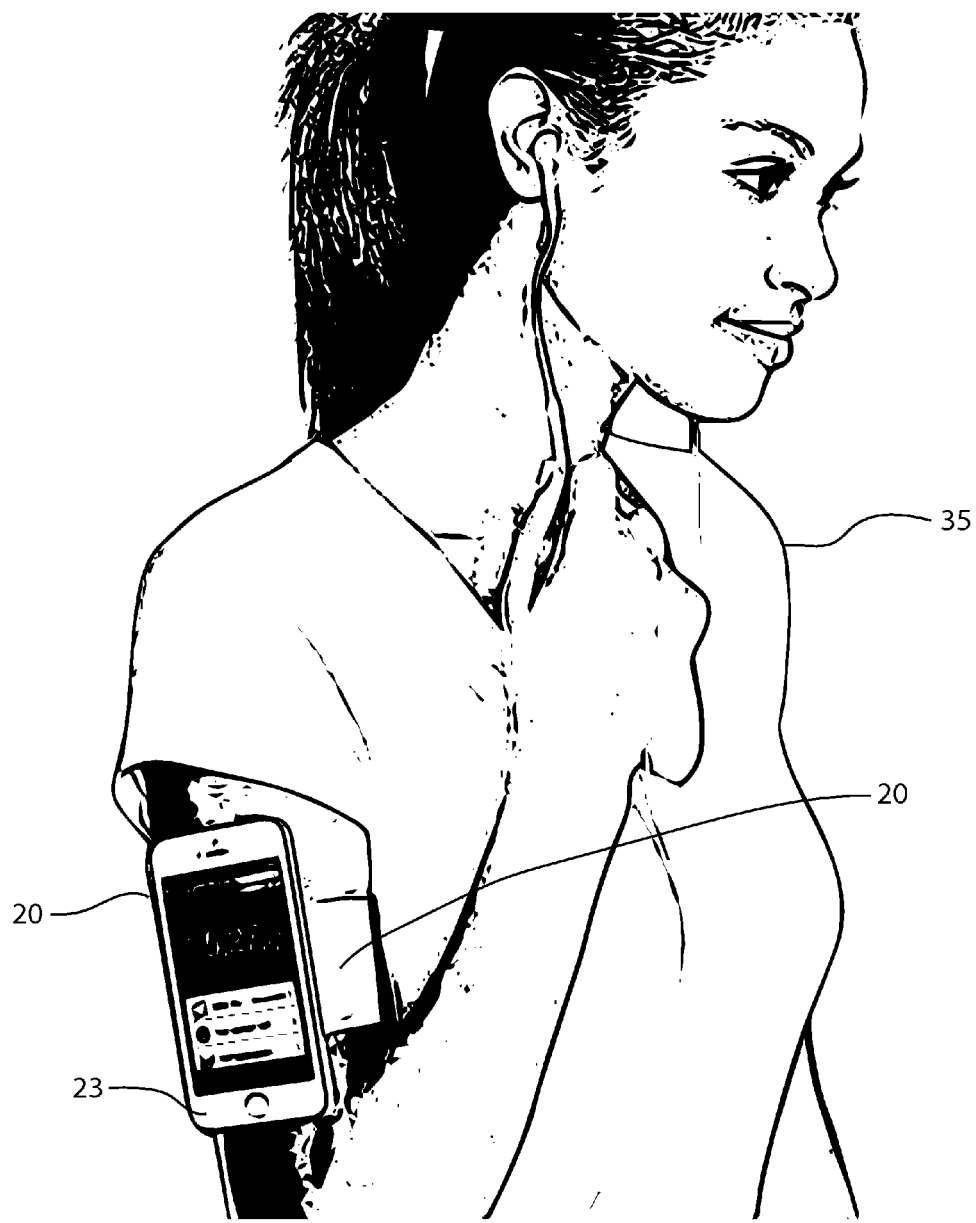

FIG. 6 shows another view of band 20 placed around the upper arm of user 35. Portable device 23, held securely in portable device holder 22, is available for use by user 35 while engaged in rest or other user activities.

While FIG. 5 and FIG. 6 show attachment to a user at the upper arm, a user attachment mechanism such as a band, strap or clip, a belt, a tie, etc. can be sized and shaped to allow mounting at other locations of a user such as the forearm, wrist, elbow, waist, ankle, foot, neck, head and so on. The location of attachment is selected, for example, so that user 35 is allowed to perform normal or typical user activities (including, for example, exercise of all kinds and type) without hindering user 35 from performing such activities. As further described below, the magnetic bond used to secure portable device holder 22 allows user 35 to rapidly and easily remove portable device 23 along with portable device holder 22 from docking area 21, without removing the user attachment mechanism from user 35.

Figure 7:
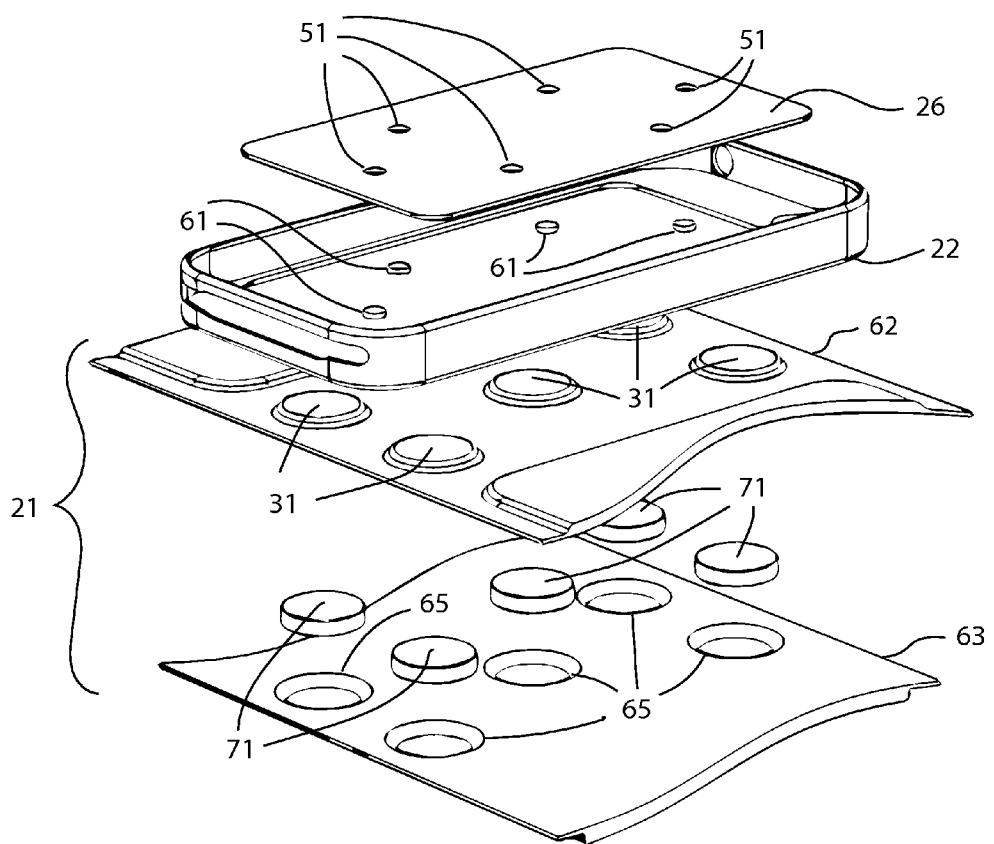
FIG. 7 and FIG. 8 provide implementation details of the portable docking device in accordance with an implementation.

FIG. 7 shows an example implementation of docking area 21 having an inside layer 63 that is worn nearest the user and an outside layer 62. Magnets 71 are placed within protrusion areas 31, one magnet per protrusion area. For example, the magnets are neodymium magnets. While FIG. 7 shows five magnets being used, the number of magnets will vary based on implementation. For example, the number of magnets can be one, two or more. Magnets 71 are held within protrusion areas 31 by inner layer 63. For example, well regions 65 are used to align and hold magnets 71 between inside layer 63 and outside layer 62.

While the implementation in FIG. 7 shows magnets mounted in docking area 21 and a metal plate within portable device holder 22, other implementations could utilize different arrangements of metal and magnets. For example, instead of the arrangement shown in FIG. 7, one or more magnets could be integrated within portable device holder 22 and metal or other ferromagnetic material could be located within docking area 21. Alternatively, one or more magnets could be integrated within portable device holder 22 and one or more magnets could be integrated within docking area 21.

Figure 8:
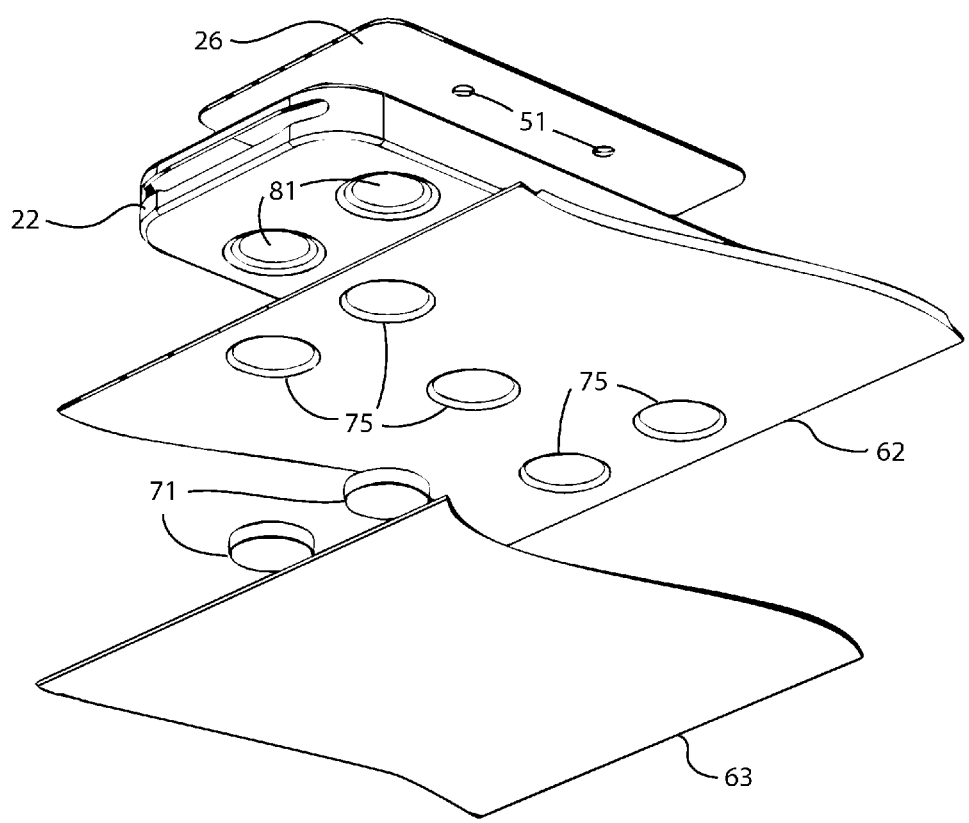

FIG. 8 shows inset areas 81 within portable device holder 23. Inset area is sized and located so that when portable device holder 22 is securely attached to the mounting device consisting of band 20, docking are 21 and magnets 71, each of protrusion areas 31 fits within one of the inset areas 81. For example, as can be seen from FIG. 8, inset areas 81 have sloped side walls to help guide protrusion areas 31 into inset areas 81. The magnetic field generated by magnets 71 securely hold portable device holder 22 to docking area 23; however, because it is a magnetic bond, portable device holder 22 can be easily and quickly removed from docking area 23 by user 35. In FIG. 8, it is shown that magnets 71 are slipped into indentations 75 of outside layer 62. Indentations 75 on the underside of outside layer 62 correspond in location to protrusion areas 31 on top of outside layer 62.

For example, the magnetic bond provides sufficient pull and retention strength to securely attach portable device holder 22 to docking area 21. Additional features such as protrusion areas 31, inset areas 81 and elevated regions 36 and 37 may provide additional retention, security and/or protect against dislodgement of portable device holder 22 from docking area 21 due to, for example, shear forces, shock and/or vibrations.

While FIG. 7 and FIG. 8 shows protrusion areas 31 and inset areas 81, such protrusion areas and inset areas may be omitted in other implementations. The absence of these may, for example, facilitate ease of removal of portable device holder 22 from docking area 21.

Figure 9:
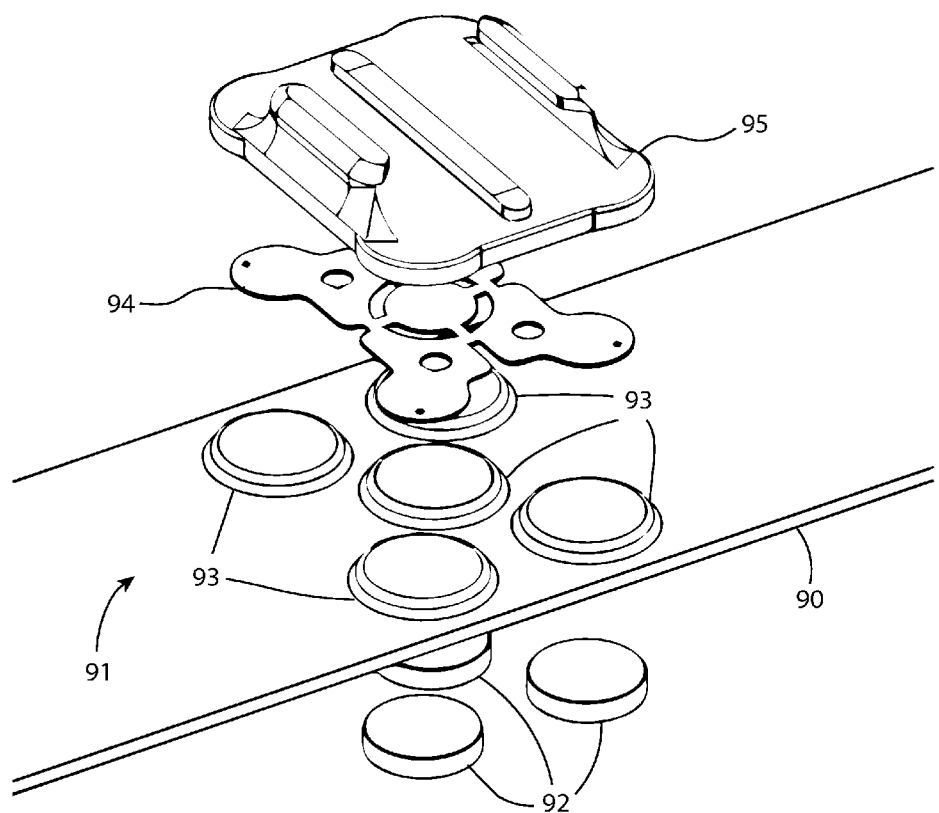
FIG. 9 and FIG. 10 show detail of an alternate embodiment of a case being mounted on a portable docking device in accordance with an implementation.
Figure 10:
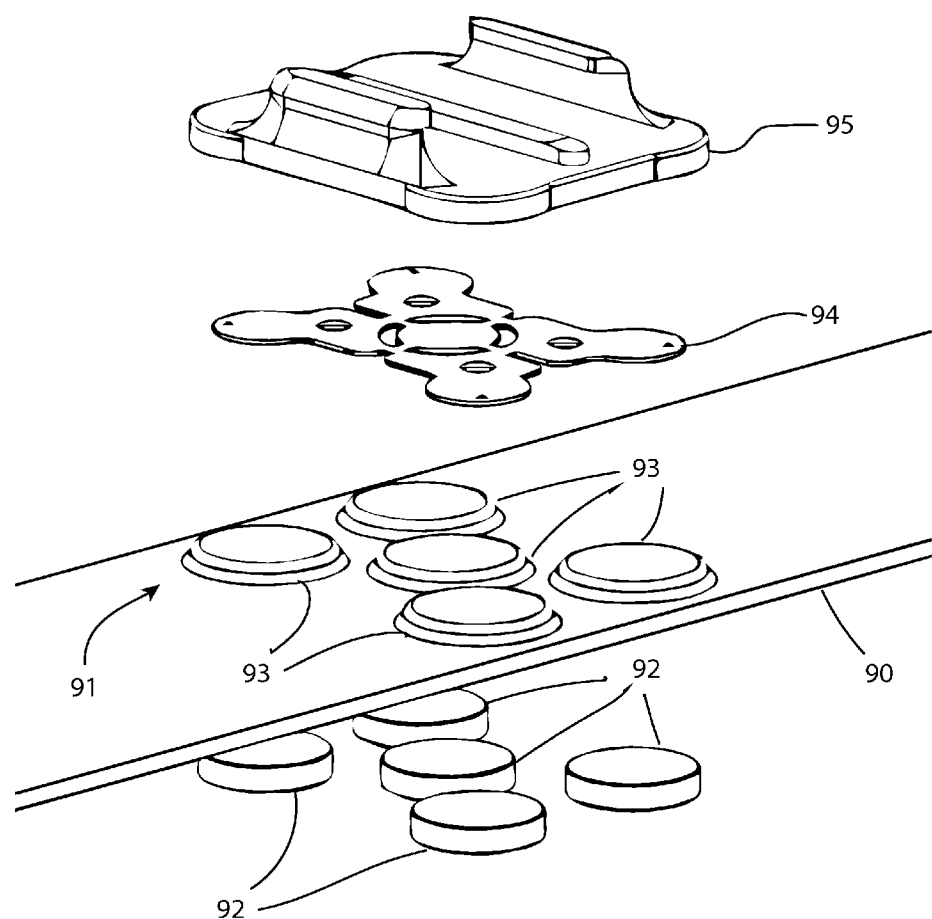

FIG. 9 and FIG. 10 show a cradle 95 that can be used to hold a portable device such as a camera, smart phone, health monitoring device and so on. Cradle 95 serves as a portable device holder. Magnets 92 are placed within protrusions 93 of a docking area 91 of a strap 90. A metal plate 94, attached to an outside of cradle 95, or placed within cradle 95, serves as ferromagnetic material used to bond cradle 95 to docking area 91.

In the embodiment shown in FIGS. 9 and 10, there is no inset areas. The lack of inset are can, for example, facilitate ease of removal of cradle 95 from docking area 91. The thicknesses of the magnets and/or other ferromagnetic material is selected, for example, to facilitate a sufficient contact to generate a desired level of magnetic bonding.

For all the implementations discussed above, where both the docking area or the portable device holder have multiple magnets paired with multiple other ferromagnetic material to form a plurality of magnetic pairs securing the portable device holder to the docking area, the pull and/or retention strength of each magnetic pair may be configured to have different values for different magnetic pairs. For example, certain magnetic pairs have less pull and/or retention strength than other magnetic pairs. For example, those magnetic pairs that are initially engaged by to remove the portable device holder from the docking area may have a lower pull and/or retention strength to facilitate ease of removal of the portable device holder from the docking area.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A portable docking device comprising:
   a mounting device that is configured to be attached to a user, the mounting device including:
      a user attachment mechanism,
      a docking area, wherein the docking area comprises: an inside layer that is worn nearest the user and an outside layer, and
      first ferromagnetic material attached to the docking area of the mounting device, wherein the first ferromagnetic material comprises a plurality of ferromagnetic elements, and wherein the first ferromagnetic material is located between the inside layer and the outside layer, and wherein the outside layer at the docking area comprises a protrusion area operable to hold the first ferromagnetic material; and,
   a portable device holder being configured to receive and hold securely a portable device, the portable device holder including:
      second ferromagnetic material being positioned on the portable device holder so as to allow the portable device holder to be securely attached to the mounting device by a magnetic field generated at least one of the first ferromagnetic material and the second ferromagnetic material, wherein the second ferromagnetic material is a metal plate, and wherein the portable device holder comprises an inset area sized so that the protrusion area fits within the inset area.

2. A portable docking device as in claim 1, wherein the user attachment mechanism is one of the following:
   a band;
   a strap;
   a clip;
   a belt;
   a tie.

3. A portable docking device as in claim 1, wherein the portable device holder is a case.

4. A portable docking device as in claim 1, wherein the portable device holder is a cradle.

5. A portable docking device as in claim 1, wherein the metal plate is located within the portable device holder.

6. A portable docking device as in claim 1, wherein the inset area is sized and located so that when the portable device holder is securely attached to the mounting device, the protrusion area fits within the inset area.

7. A portable docking device as in claim 1, wherein the metal plate is attached to an outside region of the portable device holder.

8. A portable docking device as in claim 1, wherein the portable device holder is integrated as housing for the portable device.

9. A portable docking device as in claim 1, wherein when the metal plate is aligned within the portable device holder, wherein the metal plate fits into a recess in the portable device holder in order to maintain alignment of the metal plate within the portable device holder.

10. A portable docking device comprising:
   a mounting device that is configured to be attached to a user, the mounting device including:
      a user attachment mechanism,
      a docking area, wherein the docking area comprises: an inside layer that is worn nearest the user and an outside layer,
      a plurality of magnets attached to the docking area of the mounting device, wherein the plurality of magnets are located between the inside layer and the outside layer, and wherein the outside layer at the docking area comprises an associated protrusion area for each of the plurality of magnets, wherein the protrusion area of each of the plurality of magnets is within the associated protrusion area;
   wherein the mounting device is configured to receive a portable device holder that is configured to receive and hold securely a portable device, where the portable device holder includes ferromagnetic material positioned on the portable device holder so as to allow the portable device holder to be securely attached to the mounting device by a magnetic field generated by the plurality of magnets, wherein the ferromagnetic material is a metal plate, and wherein the portable device holder an inset area for every protrusion area, the inset area being sized and located so that when the portable device holder is securely attached to the mounting device, the protrusion area fits within the inset area.

11. A portable docking device as in claim 10, wherein the user attachment mechanism is one of the following:
   a band;
   a strap;
   a belt;
   a clip;
   a tie.

12. A method for mounting a portable electronic device on a user, the method comprising:
   attaching a mounting device to the user where the mounting device has a docking area and first ferromagnetic material attached to the docking area of the mounting device, wherein the docking area comprises: an inside layer that is worn nearest the user and an outside layer, wherein the first ferromagnetic material comprises a plurality of ferromagnetic elements, and wherein the first ferromagnetic material is located between the inside layer and the outside layer, and wherein the outside layer at the docking area comprises a protrusion area operable to hold the first ferromagnetic material;
   placing a portable device in a portable device holder that is configured to receive and hold securely the portable device, portable device holder including second ferromagnetic material positioned on the portable device holder so as to allow the portable device holder to be securely attached to the mounting device by a magnetic field generated at least one of the first ferromagnetic material and the second ferromagnetic material, wherein the second ferromagnetic material is a metal plate, and wherein the portable device holder comprises an inset area sized so that the protrusion area fits within the inset area;
   placing the portable device holder on the mounting device, so that the magnetic field securely holds the portable device holder to the mounting device.

13. A method as in claim 12, wherein the portable device holder is a case or a cradle.

14. A method as in claim 12, wherein placing the portable device holder on the mounting device includes aligning the protrusion area within the mounting device to fit within the inset area of the portable device holder.

15. A method as in claim 12, wherein the user attachment mechanism is one of the following:
   a band;
   a strap;
   a belt;
   a clip;
   a tie.

16. A method as in claim 12, wherein the portable device holder is integrated as housing for the portable device.

* * * * *